United States Patent [19]

Gibson

[11] 4,109,449
[45] Aug. 29, 1978

[54] FRUIT PICKING APPARATUS

[76] Inventor: Otto L. Gibson, 1776 6th St. NW., Winter Haven, Fla. 33880

[21] Appl. No.: 698,852

[22] Filed: Jun. 23, 1976

[51] Int. Cl.$^2$ .......................................... A01D 46/24
[52] U.S. Cl. ................................................ 56/328 R
[58] Field of Search ............... 56/328 R, 330, 327 R, 56/10.2, 10.4

[56] References Cited

U.S. PATENT DOCUMENTS

| | | | |
|---|---|---|---|
| 3,127,725 | 4/1964 | Richardson | 56/328 R |
| 3,138,912 | 6/1964 | Mays et al. | 56/328 R |
| 3,257,789 | 6/1966 | Carlson | 56/10.4 |
| 3,413,786 | 12/1968 | Wehr | 56/328 R |
| 3,475,889 | 11/1969 | Overstreet et al. | 56/328 R |
| 3,646,741 | 3/1972 | Edwards et al. | 56/328 R |
| 4,000,601 | 1/1977 | St. Petery, Jr. | 56/328 R |

*Primary Examiner*—Russell R. Kinsey
*Attorney, Agent, or Firm*—Duckworth, Hobby, Allen & Pettis

[57] ABSTRACT

A fruit harvesting machine for harvesting citrus fruit has a plurality of booms mounted to a vehicle. The booms are mounted to pass through fruit trees as the vehicle mmoves along for picking fruit on the trees. Each boom has fruit picking devices mounted thereon for collecting the fruit and conveying it to the vehicle and each boom has a breakaway mechanism allowing the boom to individually swing towards the vehicle responsive to contact with large tree limbs to allow individual booms to clear the tree limb and then be restored to its normal position to prevent damage to the larger limbs. Each boom has a plurality of fruit picking members and stationary discs mounted on a rotating shaft mounted to the boom for twisting fruit from limbs.

17 Claims, 10 Drawing Figures

FRUIT PICKING APPARATUS

BACKGROUND OF THE INVENTION

1. Field of the Invention

This invention relates to fruit harvesting machines and more particularly to an automatic fruit picking machine for picking citrus fruits, such as oranges, grapefruit, or the like, from trees.

2. Description of the Prior Art

In the past, the picking of citrus fruits other than by hand and with aids such as cherry pickers has presented many problems because the fruit is very strongly held to the trees and thus takes considerable force to remove without damage to the fruit or to the trees.

Many approaches have been devised to remove citrus fruit by machine harvesting, but these have frequently been copied from harvesters used for other types of fruit, vegetables or nuts and herebefore have had only limited success. One approach has been to shake the tree with a mechanical shaker which grasps the tree trunk and rapidly shakes the fruit loose while a net of some type is used to catch the fruit that falls from the tree. Alternatively, the fruit can be allowed to fall to the ground where a windrowning machine can be used to gather the fruit from the ground. These type of devices have met with only limited success on those types of fruits that are more loosely held to the trees and can do considerable damage to the trees. Attempts have been made to find ascession chemicals to apply to the trees for loosening the fruit, but such chemicals have to date been expensive and have not always proven safe. Another approach has been to blow the fruit off the trees with big wind producing machines, but this approach has problems similar to the shaking mechanisms in that the trees are damaged by small limbs and the like being blown off the tree along with the fruit. Other prior art devices have tried raking the fruit off with long armed mechanical rakes moved through the trees in various manners in order to pull the fruit from the trees, but this method also results in damage to the trees by pulling small limbs therefrom and by bruising and scraping the fruit and limbs. One group of devices has used a large group of spindles or bores that are rotated and moved into the tree to cut or twist the fruit loose and various devices for cutting the limbs holding the fruit have been suggested as has the application of a DC voltage to the trees to loosen the fruit.

A typical prior art fruit harvesting machine can be seen in the Lasswell U.S. Pat. No. 3,222,855, for harvesting spindles having rotatable spindles for insertion into fruit trees and in the Tanner U.S. Pat. No. 3,483,687, for citrus fruit harvester having a plurality of spindle elements for insertion into the trees for breaking the fruit loose from the tree. A similar patent can be seen in the Pool U.S. Pat. No. 3,153,311 for a mobile fruit picker with rotating harvesting spindles. Another Lasswell U.S. Pat. No. 3,458,982 teaches a fruit picking spindle arrangement therefor for breaking the fruit from the trees by twisting the fruit with rotating spindles. Each of this group of prior patents illustrates a plurality of spindles or twisting members which are directed, points first, from the outer perimeter towards the center of the tree. In contrast, the present invention moves along a row of citrus trees, with a plurality of booms passing sideways through one side of each tree passed.

Additional prior art patents may be seen in a U.S. Pat. by Bartram No. 3,543,494, which teaches a fruit picker with a plurality of rotating screws for inserting and twisting fruit from a tree and in the Recker U.S. Pat. No. 3,527,039 which illustrates a fruit harvester including reciprocable and rotatable rod-like helical members. The Staats U.S. Pat. No. 3,475,888 has tines that engage the fruit in the tree and feed it into a rotating, twisting element for breaking the fruit and dropping it into a conveyor, and the McCray U.S. Pat. No. 3,427,796 has rotating picker heads which rotate in opposite directions for gripping and twisting the fruit free.

SUMMARY OF THE INVENTION

The present invention relates to citrus fruit harvesting machines and especially to an automatic citrus picking machine mounted to a movable vehicle and having a plurality of booms mounted to either one or both sides thereof for extending away from the vehicle for engaging one side of each citrus tree in a row as the vehicle moves between rows of trees. Each boom mounted to the vehicle has a plurality of fruit picking members thereon for picking fruit from a tree as the booms move therethrough. Each boom also has a breaking away mechanism attaching the boom to the vehicle for allowing each boom to individually swing back towards the vehicle upon contacting a large tree limb until the boom clears the limb and then restoring the boom back into alignment with the other booms after clearing the limb so as to prevent damage to larger limbs of a tree being harvested. The fruit picking members mounted to each boom are mounted to an elongated rotatable shaft mounted on each boom and one group of alternating disc are rotatable mounted to the shaft with each having a plurality of finger twisting members mounted thereon. A second set of fruit engaging discs are intermittently mounted with the rotatable fruit twisting members to the elongated shaft on the boom but are fixedly held by a stabilization bar to prevent rotation so that the rotating members having the twisting fingers thereon can engage pieces of fruit against the fixed members for twisting the fruit loose. The fruit is then dropped into a conveyor mounted on each boom which conveys the fruit back to the vehicle.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
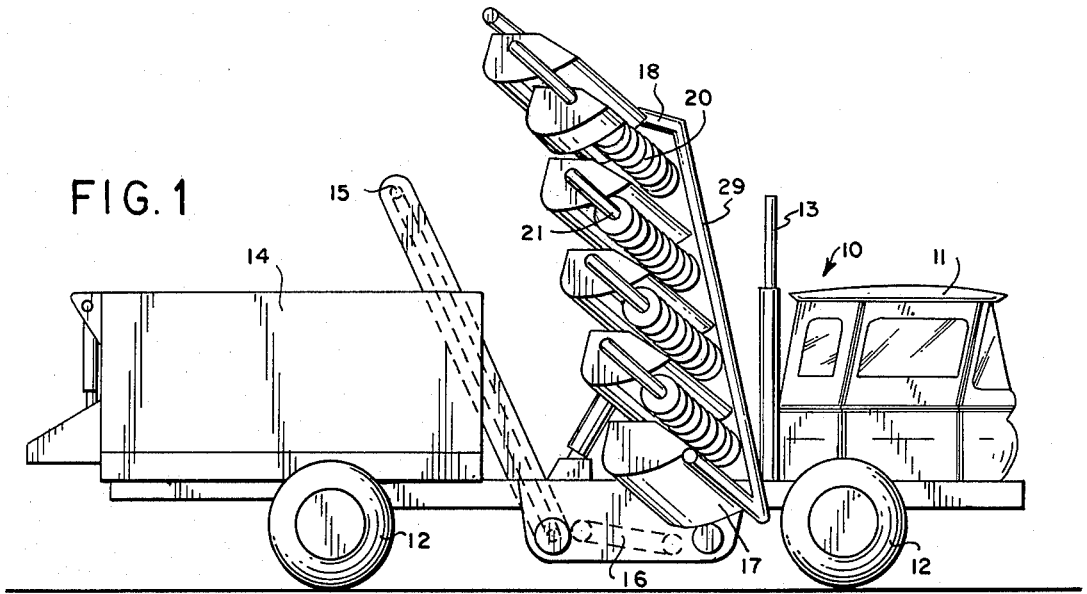
FIG. 1 is a side elevation of a fruit harvesting machine in accordance with the present invention.
Figure 2:
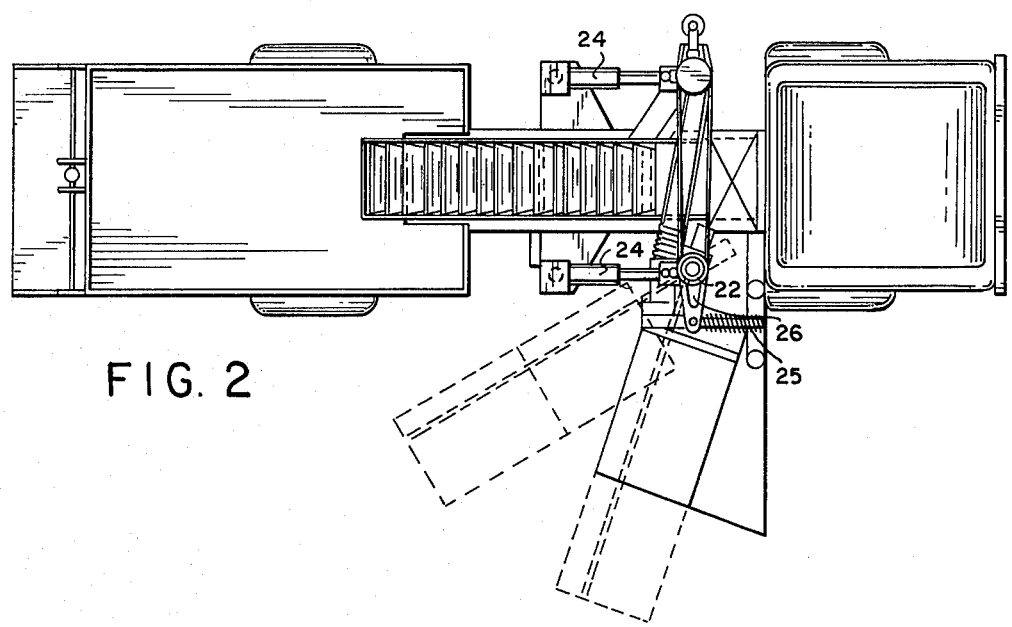
FIG. 2 is a top plan view of the fruit harvesting machine in FIG. 1.
Figure 3:
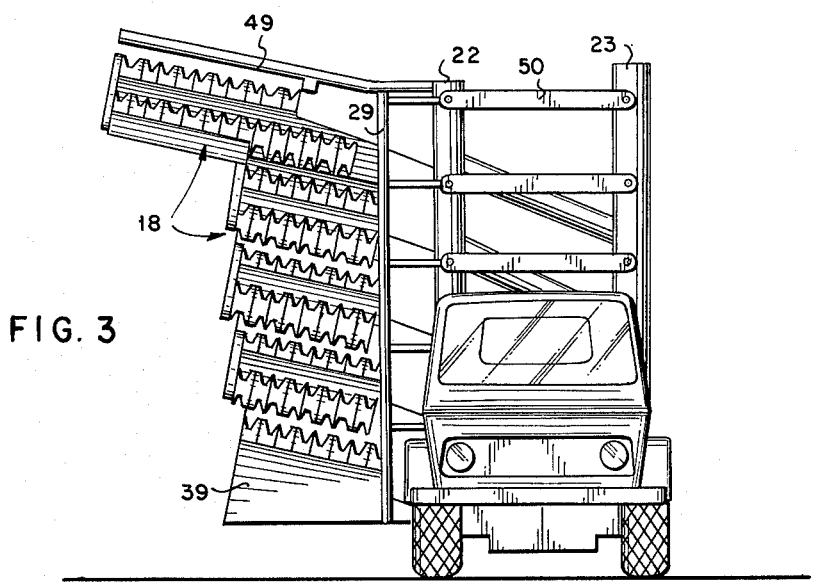
FIG. 3 is a front elevation of the harvesting machine of FIGS. 1 and 2.
Figure 4:
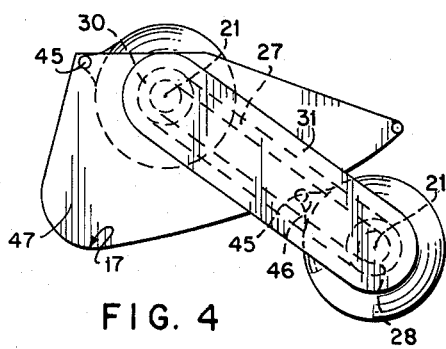
FIG. 4 is an enlarged end elevation of one boom.

Referring now to the drawings and especially to FIGS. 1 through 3, an overall preferred ebodiment is illustrated mounted on a vehicle 10 having a vehicle cab 11, tires 12, and a protruding exhaust pipe 13 with a hopper 14 on the back of the vehicle 10 built as a scissors type dump truck. The fruit is fed to the hopper 14 by main fruit conveyor 15 which is fed by a conveyor 16 which receives fruit from a plurality of catch pan conveyors 17. The conveyors 17 are mounted directly beneath and form part of booms 18. Booms 18 having a plurality of picker heads 20 mounted on shafts 21 forming part of each boom. The booms are all supported on a boom support column 22 made up of individual boom support sections 19 rotatable stacked onto each other and by boom support framework 23 which framework is supported by a pair of cylinders 24 which can be utilized to shift the position of the entire column of booms 18 or to lower the booms for travel between groves. Each boom is supported by a boom swing mechanism which allows each boom to swing horizontally as illustrated by the dash line of one swinging boom in FIG. 2. Thus, the boom may be swung backwards out of the way of a large limb to avoid damaging the limb and then be restored to its position with the other booms by a spring 25 which is compressed by the swinging boom and has sufficient force to restore the boom to its normal position. Each pair of booms has a hydralic motor 26 connected directly to one of the rotatable shafts of one boom which shaft is coupled to the shaft of a second boom as illustrated in FIG. 4. Pairs of shafts 21, parallel to each other are connected by belts 27, and a pair of pulleys 28 and 30 covered by a protective cover 31 so that one hydralic motor drives pairs of shafts 21. The fruit catcher and conveyor pans 17 can be seen from one end in this view and can be seen in FIGS. 1 through 3. One fruit catch pan and conveyor 17 may be utilized for each pair of shafts 21 having the picker heads 20 thereon. A branch deflector bar 44 is mounted a side member 29 extends along the inside of the booms to deflect uppermost limbs and a bottom skirt 39 lifts limbs into the bottom most shaft of picking members.

Figures 5, 6:
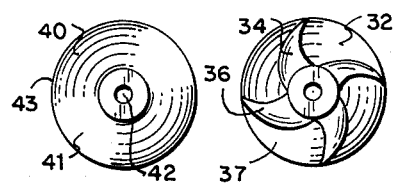
FIG. 5 is a plan view of a fixed disc.
FIG. 6 is a plan view of one side of a rotatable disc.
Figure 7:
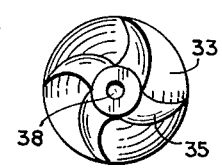
FIG. 7 is a plan view of the other side of a rotatable disc.
Figure 8:
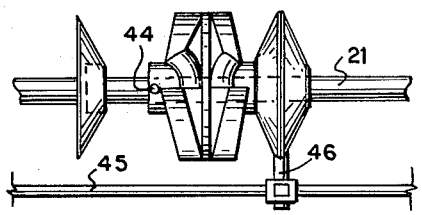
FIG. 8 is a fragmentary elevation view in FIGS. 5, 6, and 7 mounted to a boom shaft.
Figure 9:
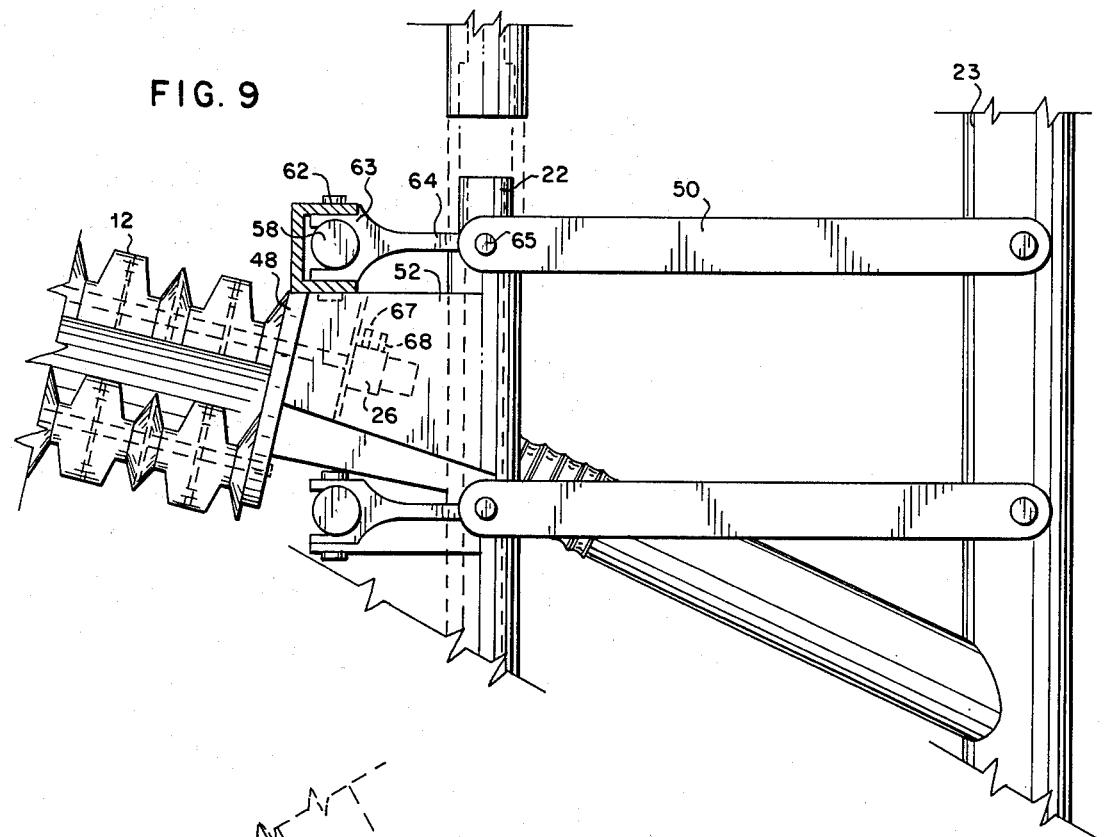
FIG. 9 is a side elevation of the breakaway mechanism for a boom.
Figure 10:
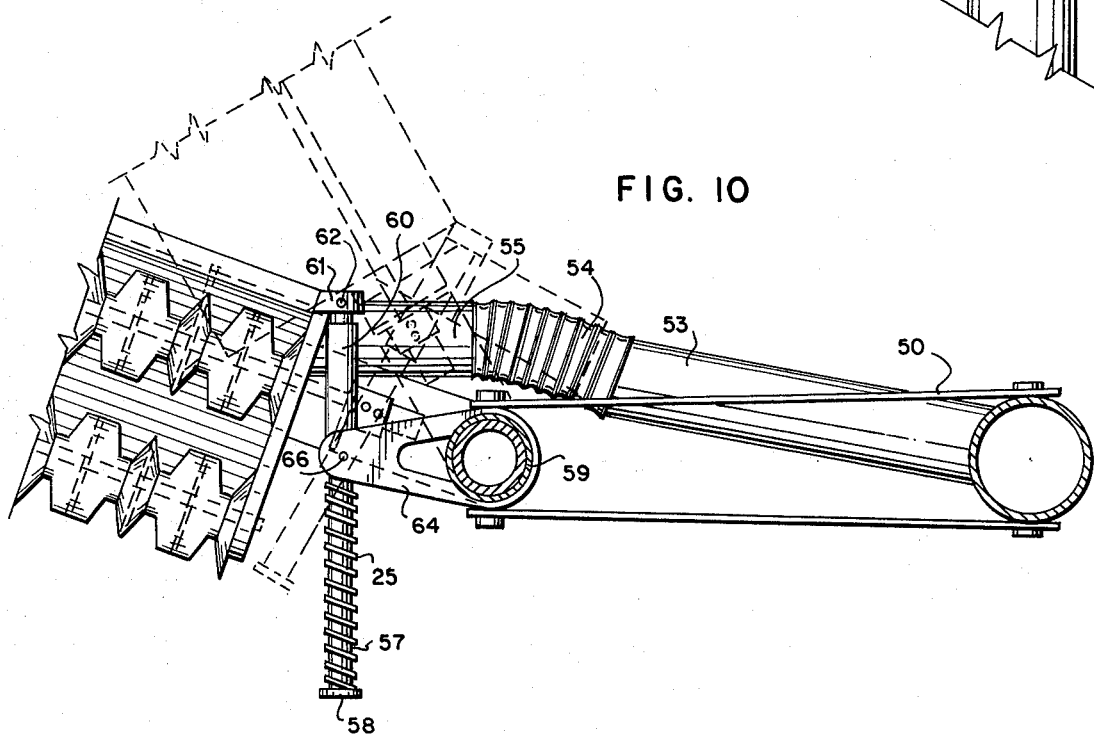
FIG. 10 is a top elevation of the breakaway mechanism of FIG. 9.

The picking means on each shaft 21 includes a plurality of intermittently spaced rotary discs 32 and 33 as illustrated in FIGS. 6 and 7 which can be either opposites sides of the same rotary disc or can be separate discs placed back to back so that the fruit collecting ridges 34 on disc 32 and 35 on disc 33 face in opposite directions. The collecting ridges 34 and 35 are in a generally spiral pattern with an angled surface 36 angling towards a slightly curved base surface 37 of each disc. Each disc also has an opening 38 passing therethrough for sliding the disc onto the shaft. A fixed disc 40 (FIG. 8) has a slightly curved surface 41 slanting or curving from the center opening 42 to the perimeter 43 as illustrated in FIG. 5 and would be similar to the rotary disc 32 and 33 without the collecting ridges 34 and 35. On each shaft 21 the discs are lined up with a disc 40 on either side so that one non-rotating disc faces each set of collecting ridges 34 and 35. The rotary discs may be attached to the shaft with threaded screws 44 or the like, so as to rotate with the shaft 21 while the discs 40 are not fixedly secured to rotate on the shaft but are held in position by a stabilizer bar 45 having holding brackets 46 as illustrated in FIGS. 4 and 8 and which can either rigidly hold the fixed disc 40 or can apply a braking force to allow only slight rotational movement. Shafts 21 are attached to the hydralic motors 26 on the one end and each by the outer ends 47 of the pan 17 and or the inner sides 48 of the pan 17 which may have journaled ends attached thereto and attached to the rigid protective cover 31. In addition, the stabilizer rods 45 are attached to the ends 47 and 48 of the pan 17. The booms 18 are cantilevered out so as to require additional support therefor which includes the supporting framework 23. As seen in FIGS. 9 and 10, the supporting framework 23 has a pair of linkage arms 50 and 51 pinned to the supporting framework and to the central boom support 22. Booms 18 are also braced against the central boom support 22 by brace members 52 which are attached to the end portion 48 of the conveyor pans 17 and to the boom support 22. A fruit conveyor tube 53 has a flexible joint 54 which is connected to a smaller tube 55 which is attached through the end support plate 48 to allow fruit collected in the pans 17 to be fed therefrom through tubular members 54, 53, and 23 to the conveyor 16 (FIG. 1).

The boom swing and return mechanism is more clearly illustrated in FIGS. 2 and 10 in which the restoring spring 25 is illustrated as a compression spring mounted on a shaft 57 having a flanged head 58 acting as a spring stop at one end and having a sleeve 60 slid over the shaft 57 at the other end which is located between the spring and a bracket 61 which is fixedly attached to the end support wall 48. The shaft 57 is attached with a pin 62 to the bracket 61 while the sleeve 60 is held by a yoke 63 through a linkage arm 64 which fits around the boom support 22 where it is anchored with pins 65 to linkage arms 50 and 51 from the framework 23 to the support 22 allowing boom 22 section 19 to rotate in arm 64 opening 59. The yoke 63 is held by a pin 66 to the sleeve 60 so that when the picking boom 18 is rotated, it pulls the shaft 57 through the sleeve 60 compressing the spring 25 against the end flange 58 which spring expands to restore the boom 18 into its initial position. Each successive support linkage 50 and 51 connects to the next arm 64 which connects to the next portion of the shaft boom immediately below the one described so that a series of booms are supported in an identical manner.

It should be clear at this point that while a compression spring arrangement has been illustrated, other types of biasing means could be used to restore the boom following its initial swing, and that while a hydralic motor 26 is connected directly to each pair of shafts 21 and is operated through input hydralic hose 67 and output hydralic hose 68, other drive means could be utilized without departing from the spirit and scope of the invention. However, inasmuch as the hydralic pumping system is provided for operating the hydralic cylinders, the same power source can be utilized for driving the conveyors and picking heads without having to provide a plurality of drive sources. It should also be clear at this point that other features can be easily added to improve the invention as desired, such as having the boom on the vehicle as illustrated in FIG. 3 extending from both sides of the vehicle or having different means of catching and conveying the fruit into the hopper 14.

Accordingly, the present invention is not to be construed as limited to the particular forms disclosed herein since these are to be regarded as illustrative rather than restrictive.

I claim:

1. A fruit picking apparatus comprising in combination:
   an elongated boom having an elongated rotatable shaft mounted thereto;
   a plurality of rotatable fruit twisting members mounted on said rotatable shaft of said boom to rotate with said shaft, each said rotatable fruit twisting member having a fruit twisting surface thereon;
   a plurality of fruit engaging members mounted to said boom, at least one fruit engaging member being mounted adjacent each rotatable fruit twisting member whereby fruit can be engaged between a rotatable fruit twisting member and a fruit engaging member for twisting fruit from its stem; and
   a stabilization bar mounted parallel to said rotatable shaft on said elongated boom and coupled to each fruit engaging member to prevent the rotation of said fruit engaging member on said rotatable shaft.

2. The apparatus in accordance with claim 1 in which said stabilization bar has a plurality of brackets thereon, one bracket positioned adjacent and coupled to each fruit engaging member to prevent the rotation of said fruit engaging member.

3. The apparatus in accordance with claim 3 in which each said rotatable fruit twisting member has two operative sides and a fruit twisting surface on each operative side thereof.

4. The apparatus in accordance with claim 3 in which each said fruit engaging member is generally disc shaped.

5. The apparatus in accordance with claim 1 in which each of said rotatable fruit twisting members is generally disc shaped and has a fruit engaging surface with tapering generally spiral ridges thereon.

6. The apparatus in accordance with claim 1 in which each elongated boom has a catching pan mounted thereto to catch fruit twisted from the stems on a tree by said plurality of rotatable fruit twisting members.

7. The apparatus in accordance with claim 1 in which said fruit picking apparatus includes a self-propelled vehicle having a plurality of said elongated booms mounted thereto.

8. The apparatus in accordance with claim 7 in which each boom is rotatably mounted to said vehicle for making a general horizontal swinging movement upon engaging a large limb in a tree.

9. The apparatus in accordance with claim 8 in which each boom has a breakaway mechanism and a boom support column supporting a plurality of booms, said breakaway mechanism allowing each boom to swing on said boom support column and having a return spring mounted for restoring said boom to its original position after swinging away from a limb.

10. A harvesting machine comprising in combination:
    a movable vehicle;
    a plurality of booms mounted to at least one side of said movable vehicle and extending away therefrom;
    each said boom having a plurality of fruit picking devices thereon for picking fruit from a fruit tree as said booms are moved therethrough;
    boom breakaway means attached to each said boom for allowing each boom to individually rotate, responsive to contacting a large tree member until said boom clears said large tree member and having resorting means for swinging said boom back to its original position after clearing a large tree member whereby said harvesting machine booms will not break large tree members as said booms pass through a portion of a tree being harvested; and
    each said boom having at least one rotatable shaft mounted thereto having a plurality of rotatable fruit twisting members mounted thereon for rotation therewith and a plurality of fruit engaging members also mounted thereon.

11. The apparatus in accordance with claim 10 in which said boom means restoring means has a shaft and a compression spring mounted there on which is compressed by the movement of said boom whereby said spring will force said boom to restore itself to its original position.

12. The apparatus in accordance with claim 11 in which each said rotatable shaft on said boom has a fluid motor mounted to one end thereof for rotating said shaft when actuated.

13. The apparatus in accordance with claim 12 having a boom support column attached to said vehicle with each said boom being mounted thereto.

14. The apparatus in accordance with claim 13 in which said boom support column has a plurality of rotatable boom sections supported by a supporting framework attached to said vehicle and each boom being attached to one rotatable boom section to rotate therewith responsive to said boom rotating when contacting a large tree member.

15. The apparatus in accordance with claim 14 in which each boom has a fruit catching pan mounted to form a part thereof and at least one rotatable shaft is mounted to said catch pan and said catch pan has bracing support members for bracing said catch pan against said boom support column.

16. The apparatus in accordance with claim 15 in which said boom restoring means has a shaft with a flanged end with a compression spring mounted thereover and held in place by a sleeve mounted over said shaft and held by at least one linkage arm mounted to said boom support column and said shaft being mounted to said boom whereby said spring is compressed on said shaft by said sliding sleeve when said boom is rotated responsive to engaging a large tree member.

17. The apparatus in accordance with claim 16 in which at least one fruit catching pan has two rotatable shafts mounted thereto and each boom thereby has two sets of rotatable fruit twisting members supported thereby.

* * * * *